United States Patent
Perez et al.

(10) Patent No.: US 7,192,643 B2
(45) Date of Patent: Mar. 20, 2007

(54) TOUGHENED CEMENTITIOUS COMPOSITES

(75) Inventors: Mario A. Perez, Burnsville, MN (US); James F. Sanders, Houlton, WI (US); Robert S. Kody, Minneapolis, MN (US); Troy K. Ista, River Falls, WI (US); Clifford N. MacDonald, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 967 days.

(21) Appl. No.: 09/950,161

(22) Filed: Sep. 10, 2001

(65) Prior Publication Data

US 2003/0044592 A1  Mar. 6, 2003

Related U.S. Application Data (60) Provisional application No. 60/314,034, filed on Aug. 22, 2001.

(51) Int. Cl.
*D02G 3/00* (2006.01)

(52) U.S. Cl. .................. 428/400; 428/141; 428/171; 428/156; 428/213; 428/293.7; 428/218; 428/323; 428/333; 428/340; 428/401; 428/403; 428/404

(58) Field of Classification Search ............. 428/294.7, 428/141, 171, 156, 213, 218, 293.7, 312.4, 428/323, 333, 340, 364, 375, 400, 401, 403, 428/404
See application file for complete search history.

(56) References Cited

U.S. PATENT DOCUMENTS 3,591,395 A   7/1971   Zonsveld et al.
3,645,961 A   2/1972   Goldfein (Continued)

FOREIGN PATENT DOCUMENTS

| EP | 0 026 581 | 5/1983 |
|----|-----------|--------|
| EP | 0 310 100 A1 | 4/1989 |
| EP | 0 488 577 B1 | 11/1993 |
| GB | 1073741 | 6/1967 |
| GB | 1130612 | 10/1968 |
| GB | 1171543 | 11/1969 |
| GB | 1234782 | 6/1971 |
| GB | 1267298 | 3/1972 |
| GB | 1541681 | 3/1979 |
| GB | 2034243 A | 6/1980 |
| GB | 1605004 | 12/1981 |
| JP | 2000256048 | 9/2000 |
| WO | 99/46214 | 9/1999 |
| WO | 00/26452 | 5/2000 |
| WO | 00/46435 | 8/2000 |
| WO | 00/49211 | 8/2000 |

OTHER PUBLICATIONS

K. Kobayashi et al., Composites, "Fexural Characteristics of Steel Fibre and Polyethylene Fibre Hybrid–Reinforced Concrete", vol. 13, (Apr. 1982), pp. 164–168.

S. Goldfein, Modern Plastics, "Fibrous Reinforcement for Portland Cement", (Apr. 1965), pp. 156–160.

(Continued)

*Primary Examiner*—Merrick Dixon
(74) *Attorney, Agent, or Firm*—Kent S. Kokko (57) ABSTRACT

The present invention relates to the field of toughening and reinforcing brittle matrix materials, and more specifically to the structural fibers made from an oriented film, which enhance the toughness of matrix materials such as concrete, cement, and other cementitious products.

28 Claims, 1 Drawing Sheet

U.S. PATENT DOCUMENTS

| | | | |
|---|---|---|---|
| 3,650,785 A | * 3/1972 | Ball et al. ..................... 106/90 |
| 3,716,386 A | 2/1973 | Kempster |
| 4,261,754 A | * 4/1981 | Krenchel et al. ............. 106/90 |
| 4,414,030 A | 11/1983 | Restrepo |
| 4,524,101 A | 6/1985 | Eickman et al. |
| 4,552,805 A | 11/1985 | Fish, Jr. et al. |
| 4,565,840 A | 1/1986 | Kobayashi et al. |
| 4,608,089 A | 8/1986 | Gale et al. |
| 5,330,827 A | 7/1994 | Hansen |
| 5,338,357 A | 8/1994 | Takai et al. |
| 5,456,752 A | 10/1995 | Hogan |
| 5,525,287 A | 6/1996 | Van Erden et al. |
| 5,628,822 A | 5/1997 | Hogan |
| 5,807,458 A | 9/1998 | Sanders et al. |
| 5,897,928 A | 4/1999 | Sanders et al. |
| 5,981,630 A | 11/1999 | Banthia et al. |
| 5,985,449 A | 11/1999 | Dill |
| 5,993,537 A | 11/1999 | Trottier et al. |
| 6,110,588 A | 8/2000 | Perez et al. |
| 6,174,595 B1 | 1/2001 | Sanders |
| 6,197,423 B1 | 3/2001 | Rieder et al. |
| 6,331,343 B1 | 12/2001 | Perez et al. |

OTHER PUBLICATIONS

G. Capaccio et al., *Polymer*, "*Effect of Molecular Weight on the Morphology and Drawing Behaviour of Melt Crystallized Linear Polyethylene*", vol. 16, (Apr. 1975), pp. 239–243.

P. J. Barham et al., *Journal of Materials Science*, "*A Study on the Achievement of High–Modulus Polyethylene Fibres by Drawing*", vol. 11, (1976), pp. 27–35.

S. Piccarolo, et al., *Journal of Applied Polymer Science*, "*Crystallization of Polymer Melts Under Fast Cooling. II. High–Purity iPP*", vol. 46, (1992), pp. 625–634.

Jones et al., *Makromol. Chem.*, "*Crystalline Forms of Isotactic Polypropylene*", vol. 75, (1964), pp. 134–158.

J. Karger–Kocsis, "*Polypropylene Structure, Blends and Composites*", vol. 1 Structure and Morphology, (1994) pp. 116–139.

R. S. Porter et al., *Journal of Macromolecular Science–Rev. Macromol. Chem. Phys.*, C35(1) "*Uniaxial Extension and Order Development in Flexible Chain Polymers*", (1995) pp. 63–115.

U.S.S.N. 09/602,978, filed Jun. 23,2000, "Fibrillated Article and Method of Making".

U.S.S.N. 09/809,446, filed Mar. 15, 2001, "Composite Articles Reinforced with Highly Oriented Microfibers".

U.S.S.N. 09/858,253, filed May 15, 2001, "Fibrous Films and Articles From Microlayer Substrates".

U.S.S.N. 09/858,273, filed May 15, 2001, "Microfiber–Entangled Products and Related Methods".

U.S.S.N. 09/957,405, filed Sep. 20, 2001, "Films Having A Microfibrillated Surface and Method of Making".

U.S.S.N. 09/974,040, filed Oct. 9, 2001, "Microfiber Articles From Multi–Layer Substrates".

* cited by examiner

TOUGHENED CEMENTITIOUS COMPOSITES

CROSS REFERENCE TO RELATED APPLICATION

This application claims priority to U.S. Provisional Application No. 60/314,034, filed Aug. 22, 2001.

FIELD OF THE INVENTION

The present invention relates to the field of toughening and reinforcing brittle matrix materials, and more specifically to the structural fibers made from an oriented film, which enhance the toughness of matrix materials such as concrete, cement, and other cementitious products.

BACKGROUND

Concrete is a brittle material that exhibits a low tensile strength and fracture toughness, not because it is inherently weak in tension, but because it contains cracks that weaken it. The ease with which cracks can nucleate and propagate in concrete under tension makes it necessary to reinforce or toughen concrete to improve the life of a structure.

The method of reinforcing concrete by adding randomly distributed fibers throughout the volume of the matrix is known. The many different types of fiber materials used to reinforce concrete include steel, glass and organic fibers such as nylon, polypropylene, and polyethylene, as described in "Fibrous Reinforcements for Portland Cement" by S. Goldfein in "Modern Plastics" (April 1965, p. 156–159).

Depending on the size and concentration of the fibers, two types of reinforcement can be obtained in fiber reinforced concrete specimens. Very fine fibers dispersed in a concrete matrix at fractional volume percentages are effective in resisting the initiation and growth of small cracks that are caused by the shrinkage of the concrete upon hardening. Larger structural fibers, such as steel or glass, control the propagation of large cracks that cause ultimate failure.

For structural fibers to most effectively toughen a concrete specimen, it is important that: the fibers be added at a sufficient volume percentage, the fibers be well dispersed in the concrete matrix, the fibers be sufficiently well bonded to the concrete matrix, and the fibers be long enough to bridge a crack. To toughen a concrete matrix with randomly oriented fibers, it is beneficial for the fibers to have high tensile properties. For these reasons, very strong and stiff steel fibers dominate the structural concrete fiber market today. These fibers, either straight or crimped, have been shown to significantly improve the residual strength of concrete after a crack has formed. However, there are several limitations to using metal fibers, including cost and oxidation of the fibers over time.

Synthetic fibers have also been shown to provide toughening in concrete. However, one problem with using high modulus synthetic fibers in concrete is that high modulus fibers are typically very fine. Unfortunately, there are two major problems with using these fine fibers with high surface area as structural fibers in concrete. First fine fibers are difficult to disperse into concrete in a practical setting at concentrations higher than 0.1 volume percent. Because of the high aspect ratio of fine fibers, they tend to agglomerate in the concrete matrix, rather than uniformly distribute when added at loadings of greater than fractional volume percentages. The second problem with using the fine fibers at sufficiently high concentrations to structurally reinforce the concrete is that fine fibers are prohibitively expensive.

Despite the cost limitations, several efforts to improve the distribution of the fine fibers in concrete have been disclosed; which describe dispersing bundles of these fine fibers into the concrete matrix and after some time in the mixing process, the individual fibers are said to disperse from the bundle.

Patent (E.P. Pat No 0,488,577 B1) utilizes a wetting agent and (U.S. Pat. No. 5,993,537) discloses the use of an inorganic binding agent, both to bundle the fine fibers and break down in the cement mixing process and hence uniformly distribute the fine fibers. (U.S. Pat. No. 4,524,101) utilizes a compressive nip roll to deform the individual filaments and form a loosely adhering bundle of filaments. The bundle is dispersed into the concrete and the individual filaments are distributed as the bundle breaks apart during mixing with the concrete.

U.S. Pat. No. 6,197,423 B1 discloses a fiber that is passed between two nip rolls, thereby flattening and causing microdiastrophism. When mixed in the concrete, some fraction of the fibers can fibrillate and separated from the large fiber, thereby providing small fibers that inhibit crack initiation.

Another form of bundling fine fibers for easier dispersion into concrete matrices is to fibrillate a thin film into a bundle or net of interconnected fibers. The addition of fibrillated plastic filaments to cement mortar or concrete has been disclosed in U.S. Pat. No. 3,591,395. Numerous patents have disclosed variations of fibrillated films that have been used to reinforce concrete (U.S. Pat. No. 3,591,395); (G.B. Pat. No. 2,034,243A); (G.B. Pat. No. 1,605,004); (E.P. Pat. No. 0,026,581); (U.S. Pat. No. 4,414,030); (U.S. Pat. No. 5,330,827); (U.S. Pat. No. 5,456,752); (U.S. Pat. No. 5,628,822); (G.B. No. 1,130,612). All of these fibrillated films take the form of discrete groups of interconnecting fibers. In each of these patents, the films are fibrillated using a rotating drum or roller having cutting elements such as needles or teeth in contact with the moving film. The result of each is a fibrillated film, made of interconnecting fibers that are proposed to break apart into individual fibers during mixing with the concrete.

A problem with the use of fibrillated films made of interconnecting fibers is that the individual fibers may not break apart during mixing with the cement and complete dispersal of the fibers is not achieved. To ensure that the fibers harvested from a film do indeed separate into individual fibers and disperse into the concrete matrix, U.S. Pat. No. 4,261,754 disclosed the benefit of fully fibrillating a film into individual fibers, prior to mixing into the concrete.

As with the fine fibers, the addition of large amounts of the larger fibers into concrete also causes balling and limits the distribution of fibers in the concrete matrix. Again methods were developed that allow for these fibers to be uniformly distributed into the concrete matrix (U.S. Pat. No. 3,716,386), (W.O. Pat. No. 00/49211), (U.S. Pat. No. 5,807,458), and (U.S. Pat. No. 5,985,449). One particularly useful method of dispersing up to 7 wt-% or higher of fibers into the concrete matrix is through the use of a low aspect ratio bundle-wrap that releases the fibers in the concrete matrix after sufficient time to allow each of the bundle to adequately disperse (U.S. Pat. No. 5,807,458).

SUMMARY OF THE INVENTION

In one aspect, the present invention provides fiber-reinforced cementitious articles having increased fracture toughness, and decreased crack propagation when compared to the prior art reinforced composites. In another aspect, the present invention provides fiber-toughened cementitious articles having decreased brittleness due to the dispersed fibers in the cementitious matrix. In another aspect, a cementitious article is provided having isotropic mechanical properties due to the randomly dispersed fibers in the cementitious matrix.

Briefly, the present invention is directed to cementitious composite comprising discrete, oriented polymeric fibers of thickness greater than 127 micrometers (5 mils) in thickness, a transverse aspect ratio (thickness to width) of 1:1.1 to 1:75. The fibers have a modulus of at least 1000 Kpsi (~6895 MPa), preferably at least 1500 Kpsi (10342 MPa), which provides structural reinforcement to the brittle cementitious matrix. The larger fibers used in the present invention have been found to disperse more readily in the cementitious matrix and are less susceptible to 'pull-out' than the smaller fibers used in the prior art. Further, the present fibers have greater tensile strength and tensile modulus. By discrete it is meant that the fibers are unitary and are not interconnected with other fibers, such as in the form or a net or web. The discrete, stiff fibers allow better dispersion through the cement matrix and a more random orientation than do interconnected fibers.

The present invention also overcomes the difficulty in preparing a larger fiber having high tensile strength. Most large synthetic fibers are extruded; having circular cross-sections and low tensile properties in comparison to highly oriented fine fibers. These limitations result from the process of extruding fibers through a circular orifice and the reduction in diameter as the fibers are highly drawn. For example, to produce a stiff structural fiber oriented to at least 10:1 with a diameter greater than 15 mils (381 micrometers), the initial fiber would need to be extruded at a diameter of at least 48 mils (1219 micrometers). Making a large number of fibers of this size simultaneously would require a prohibitively large fiber die.

The high degree of orientation and the high tensile properties of the fibers reduce the tendency of the fibers to further elongate and "neck", wherein the fibers exhibit a substantial contraction in the cross-sectional area when subjected to a tensile stress. Such contraction undesirably leads to debonding between the fibers and the matrix and the fiber shrinks away from contact with the matrix. The fibers used in the present invention generally have an elongation at break less than about 10% so necking is minimized and the degree of "pull-out" is substantially reduced. Further, due to the large size, tensile strength, and low elongation, the fibers allow stresses on the concrete matrix to be dissipated through the length of the fibers and fractures or cracks that occur in the matrix may be bridged by the fibers, allow the mass to stay intact. Thus a cured cementitious matrix, though cracked, continues to withstand stresses and loads.

If desired, the fibers may be shaped, such as by crimping, or a pattern applied to one or more major surfaces of the fibers. Such shaping or patterning may improve the bond between the fiber and the cementitious matrix. In one embodiment, a microfibrillated surface may be imparted to one or more surfaces of the fibers to produce large fibers having a surface of microscopic fibers or microfibers (10 micrometers or less in average cross section).

Though not required, the cementitious composite may further comprise a quantity of smaller fibers. Such fibers are effective in restraining the propagation of microcracks that occur as the cementitious composition cures. If desired, such smaller fibers may have nominal diameters of 70 microns or less, and lengths from 0.63 to 2 cm and may be of any cross-sectional shape. Preferably such fibers, when used, are oriented. Typically such fibers are used in amounts of 0.1 to 1.0 volume percent. Useful small fibers are described, for example, in U.S. Pat. No. 3,591,395; G.B. Pat. No. 2,034, 243A; G.B. Pat. No. 1,605,004; E.P. Pat. No. 0,026,581; U.S. Pat. No. 4,414,030; U.S. Pat. No. 5,330,827; U.S. Pat. No. 5,456,752; U.S. Pat. No. 5,628,822; and G.B. No. 1,130,612.

Advantageously, the fibers used in this invention are readily dispersed in the uncured cementitious matrix, may be added at relatively high volume percents, have a high surface area to promote bonding with the matrix, provide high flexural strength to the cured composite and be made from readily available starting materials at relatively low cost. Further, the fibers may be prepared at high rates of production, are suitable as an industrial process and use readily available polymers.

Articles of various sizes and shapes in which a cast or molded article is prepared from the cementitious composition may be prepared in accord with the present invention. Articles include ballistic resistant structures, shot-crete structures, roadbeds, paths, building foundations, load-bearing walls, tiles, pipe, drain tile, sea walls and panels. Due to the high flexural strength imparted by the incorporation of fibers, the cementitious composite is particularly useful for impact-resistant structures such as those needed to resist explosive devices and weaponry.

DETAILED DESCRIPTION

A cementitious matrix refers to compositions containing a hydraulic cement binder and often coarse and/or fine aggregates such as sand or stone. Cementitious matrices include cement, mortar, grout, pozzolone and masonry, to which the fibers of the present invention may be incorporated, and the composite hydraulically cured.

The fibers used in the present invention have a thickness of 127 micrometers or more, generally from 250 microns to 1000 microns, and are substantially rectangular in cross section, having a transverse aspect ratio (width to thickness) of from 1.1:1 to 75:1, and generally about 1.5:1 to 10:1. The substantially rectangular cross-sectional shape advantageously provides a greater surface area (relative to fibers of the same cross-sectional area having round or square cross-section) making the fibers especially useful as reinforcing fibers in cast cementitious materials. The large surface area allows greater bonding to the matrix than with fibers having a round or otherwise curved cross-section. Further, due to their highly oriented morphology, the fibers have very high modulus, for example typically above 1000 kpsi (6895 MPa) for polypropylene fibers, making them especially useful as reinforcing fibers in improving the fracture toughness in cementitious composites.

Toughening or toughness, as used in this invention, primarily refers to the increased flexural toughness provided by large fibers after the matrix has cracked. Toughness may be measured by a four-point beam-bending test in which a force is imparted to a supported cementitious beam and the deflection measured. Additionally, when small fibers are used, the term toughening further refers to the prevention of crack initiation and micro-crack growth provided by small fibers during concrete hardening, physical loading, and thermal cycling. Toughness may also be measured by the "Japanese toughness test" which is determined by calculating the area under the plot of load versus deflection (out to a deflection of 2 mm). Additional descriptions of these test methods are described in the Examples.

Polymers useful in the present invention include any melt-processible crystalline, semicrystalline or crystallizable polymers. The term "melt-processible" is used herein to refer to polymers that are melt-processible under ordinary melt-processing conditions using conventional extrusion equipment without the need for plasticizer or solvent addition.

Semicrystalline polymers consist of a mixture of amorphous regions and crystalline regions. The crystalline regions are more ordered and segments of the chains actually pack in crystalline lattices. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers are always amorphous and show no tendency to crystallize. Some polymers can be made semicrystalline by heat treatments, stretching or orienting and by solvent inducement, and these processes can control the degree of true crystallinity.

The terms "amorphous", "crystalline", "semicrystalline", and "orientation" are commonly used in the description of polymeric materials. The true amorphous state is considered to be a randomly tangled mass of polymer chains. The X-ray diffraction pattern of an amorphous polymer is a diffuse halo indicative of no regularity of the polymer structure. Amorphous polymers show softening behaviors at the glass transition temperature, but no true melt or first order transition. The semicrystalline state of polymers is one in which long segments of the polymer chains appear in both amorphous and crystalline states or phases. The crystalline phase comprises multiple lattices in which the polymer chain assumes a chain-folded conformation (lamellae) in which there is a highly ordered registry in adjacent folds of the various chemical moieties of which the chain is constructed. The packing arrangement (short order orientation) within the lattice is highly regular in both its chemical and geometric aspects. Semicrystalline polymers show characteristic melting points, above which the crystalline lattices become disordered and rapidly lose their identity. Either concentric rings or a symmetrical array of spots, which are indicative of the nature of the crystalline order, generally distinguishes the X-ray diffraction pattern of semicrystalline polymers (or copolymers).

Semicrystalline polymers useful in the present invention include, but are not limited to, high and low density polyethylene, polypropylene, polyoxymethylene, poly (vinylidine fluoride), poly(methyl pentene), poly(ethylenechlorotrifluoroethylene), poly(vinyl fluoride), poly(ethylene oxide), poly(ethylene terephthalate), poly(butylene terephthalate), nylon 6, nylon 66, poly(vinyl alcohol) and polybutene. Preferred polymers are polyolefins such as polypropylene and polyethylene that are readily available at low cost, are non-reactive with the cementitious matrix, and can provide highly desirable properties in the fibers such as high modulus and high tensile strength.

The molecular weight of the polymer should be chosen so that the polymer is melt processible under the processing conditions. For polypropylene and polyethylene, for example, the molecular weight (Mw) may be from about 5000 to 500,000 and is preferably from about 100,000 to 350,000.

Because the cementitious article may be exposed to temperature extremes, it is preferred that the polymer have a melting point above 120° C., preferably above 150° C. As the cementitious article is exposed to high temperatures, the polymeric fibers could melt, and the toughness compromised. Further, it is preferred the polymer have essentially no glass transition temperature above 0° C., more preferably above −10° C. and most preferably above −25° C. Put another way, if the polymer does exhibit a glass transition temperature, it is preferably 0° C. or below, more preferably −10° C. or below and most preferably −25° C. or below. As cementitious articles are exposed to extreme cold, a glass transition temperature in these ranges leads to polymer embrittlement in the glassy state and possible failure under stress. By "essentially no glass transition temperature" it is meant that a transition is not evident when measured by dynamic mechanical analysis (DMA) at 1 Hertz, and or when measured by differential scanning calorimetry (DSC). Typically the tan delta value of the DMA analysis will be less than about 0.03.

Most preferred is a melt-processible, highly oriented (20 times or greater), highly isotactic polypropylene having a weight average molecular weight of from 50,000 to 350,000, no glass transition temperature above −30° C., an elongation at break of 5% or less, a tensile strength of 50,000 psi (~345 Mpa) or greater and a melting point in the range of 165–180° C. It has been found that such a polypropylene is not embrittled when exposed to liquid nitrogen. The most preferred polypropylene is described in the Examples.

Organic polymers typically comprise long molecular chains having a backbone of carbon atoms. The theoretical strength of the polymers is not realized due to random orientation and entanglement of the polymer chains as well as crystal defects, amorphous regions, voids and point defects. In order to obtain the maximum physical properties and render the polymer film amenable to use as structural fibers, the polymer chains need to be oriented substantially parallel to one another and partially disentangled. The degree of molecular orientation is generally defined by the draw ratio, that is, the ratio of the final length to the original length. This orientation may be effected by a combination of techniques in the present invention, including the steps of calendering and length orienting.

The fibers used in the present invention may be prepared by extruding a cast film of melt processible polymer, length orienting said cast film, slitting said oriented film into ribbons of preselected widths; and chopping said fibers to preselected lengths. If desired, the fibers may be shaped, or a pattern imparted to one or more surfaces.

In the present invention, a highly oriented, semicrystalline, melt processed film is provided having an induced crystallinity. Induced crystallinity is the maximized crystallinity that may be obtained by an optimal combination of casting and subsequent processing such as calendering, annealing, stretching and recrystallization. For polypropylene, for example, crystallinity is above 60%, preferably above 70%, most preferably above 75%. The crystallinity may be measured by differential scanning calorimetry (DSC) and comparison with extrapolated values for 100% crystalline polymers. For example, see B. Wunderlich, *Thermal Analysis,* Academic Press, Boston, Mass., 1990.

Films are generally defined, for example, by the *Modern Plastic Encyclopedia,* as thin in relation to the width and length, and having a nominal thickness of no greater than about 0.25 mm. Materials of greater thickness are generally defined as sheets. As used herein, the term "film" shall also encompass sheets and it may also be understood that other configurations and profiles such as tubes may be used with equal facility to produce the fibers used in this invention.

Generally, the crystallinity of commercially available cast films must be increased to be useful in the process of the invention. Cast films, such as those prepared by extrusion from a melt followed by quenching on a cooled casting wheel, exhibit a "spontaneous crystallinity" that results from conventional processing conditions. For example, isotactic polypropylene cast films typically exhibit crystallinity of 59–61% by DSC analysis. When using such polypropylene film in the process of the invention, it is desirable to increase the crystallinity at least 20% above this "spontaneous crystallinity" value, to about 72% or higher.

If desired, nucleating agents may be added to control the degree of crystallinity or, when using polypropylene, to increase the proportion of β-phase polypropylene in the crystalline film. β-phase nucleating agents are known and are described, for example, in Jones, et al., *Makromol. Chem.,* vol. 75, 134–158 (1964) and J. Karger-Kocsis, *Polypropylene: Structure, Blends and Composites,* vol. 1, 130–131(1994). One such beta nucleating agent is N',N',-dicyclohexyl-2,6-napthalene dicarboxamide, available as NJ-Star NU-100™ from New Japan Chemical Co. Chuo-ku, Osaka. Japan.

Any suitable combination of processing conditions may be used to impart the maximum induced crystallinity and orientation to the melt-processed film. These may include any combination of casting, quenching, annealing, calendering, orienting, solid-state drawing, roll-trusion and the like. Such processing generally also serves to increase the degree of crystallinity of the polymer film as well as the size and number of the spherulites. The suitability of a film for subsequent process steps may be determined by measuring degree of crystallinity of the polymer film by, for example, x-ray diffraction or by differential scanning calorimetry (DSC).

In one embodiment of the present invention, the polymer is extruded from the melt through a die in the form of a film or sheet and quenched to maximize the crystallinity of the film by retarding or minimizing the rate of cooling. As the polymer cools from the melt, it begins to crystallize and spherulites form from the developing crystallites. If cooled rapidly from a temperature above its melting point to a temperature well below the crystallization temperature, a structure is produced comprising crystallites surrounded by large amorphous regions, and the size of the spherulites is minimized.

In one embodiment, the film is quenched on a heated casting wheel that is maintained at a temperature above the glass transition temperature, but below the melt temperature. Normally, polypropylene, for example, is cold quenched at about 24° C. (75° F.), but in the present process, for example, a hot quench from a melt at about 220° C. (450° F.) to a quench temperature of about 70–100° C. (160–210° F.) is used. This higher quenching temperature allows the film to cool slowly and the crystallinity of the film to increase due to annealing. Preferably quenching occurs at a rate to not only maximize the crystallinity, but to maximize the size of the crystalline spherulites.

In one embodiment the film is cast onto a three roll stack of heated casting rolls in which the bottom and middle rolls form a nip into which the molten polymer is fed. The nip provides a degree of calendering to the melt, and the cast film is fed around the top casting roll to maintain temperature control before being fed to the calendering apparatus, where the solid film is subsequently calendered. It is further preferred to maintain a "rolling bank", a relatively thick mass or roll of molten polymer, before the nip of the casting rolls to maintain a homogenous, uniform film.

The effect of casting temperature and cooling rate on the crystallinity is known and reference may be made to S. Piccarolo et al., *Journal of Applied Polymer Science,* vol. 46, 625–634 (1992).

After casting (and drawing, if any), the polymer may be characterized by a relatively high crystallinity and significant spherulite formation. The size and number of the spherulties is dependent of the casting conditions. The degree of crystallinity and presence of spherulite structures may be verified by, for example, x-ray diffraction and electron microscopy.

The thickness of the film will be chosen by control of the process conditions. Cast films useful in the present invention will typically have thicknesses of 50 mils or more (1.3 mm), and preferably between 90 and 300 mils (2.3 to 7.6 mm). However, depending on the characteristics desired for the resultant composite article, they may be cast at thicknesses outside of this range.

In a preferred embodiment the cast film is calendered after quenching. Calendering allows higher molecular orientation to be achieved by enabling subsequent higher draw ratios. In the absence of a calendering step, subsequent draw ratios in the orienting step above the natural draw ratio (7:1 for polypropylene) are generally not achievable at high production rates without risking breakage. Calendering at the appropriate temperature can reduce the average crystallite size through shearing and cleaving of the entanglements, and may impose an aspect ratio on the spherulites (i.e. flatten in the transverse direction and elongate in the machine direction). Calendering is preferably performed at or above the alpha crystallization temperature. The alpha crystallization temperature, $T_{\alpha c}$, corresponds to the temperature at which crystallite subunits are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure. The calendering step has the effect of orienting the fibrils into the plane of the film from the original radially oriented sphere. The crystallites are cleaved due to the shear forces, which may be verified by wide-angle x-ray. Thus the individual fibrils are largely radial from the nucleating site, but lie in the same plane.

As one or both major surfaces of the cast film may be sheared during the calendering step, it is preferred that the calendering step be conducted so that both major surfaces are approximately equally sheared. It is therefore preferred that the cast film be calendered using a "straight through" procedure by which the film is fed through a compressive roller nip with each roller turning at a rate faster than that by which the film is fed. Alternatively, but less preferable is an "S-wrap" procedure in which the cast film is fed is an S configuration and where only one of the compressive rollers shears the film. It is further preferred to maintain the calender gap by means of hard stops, rather than by pressure applied to the calender rolls.

After calendering, the film is then oriented in the machine direction by stretching under conditions of plastic flow, that are insufficient to cause catastrophic failure of the film, (i.e., in excess of the ability of the polymer to conform to the strain). Using polypropylene, for example the films may be stretched at least 5 times its length. In a preferred embodiment, when considering both the calendering and orienting steps, the combined draw ratio is at least 10:1 and preferably in the range of 20:1 to about 40:1 for polypropylene.

If it is desired to subsequently impart a microfibrillated surface to the fibers, the stretching conditions are chosen to impart microvoids (in excess of 5% as measured by the change in density) to the surface of the film. Generally the stretching conditions may be chosen such that, under plastic flow (at a given minimum temperature and maximum stretch ratio), the temperature is reduced about 10° C. or more, or the strain imposed is increased about 10% (stretched about 10% further) to induce microvoids. Also, the temperature may be decreased and the stretch ratio increased at the same time, as long as conditions are chosen so as to exceed the ability of the polymer to conform to the strain imposed while avoiding catastrophic failure of the film.

Microvoids are small defects that occur when the film is drawn at a tension, under conditions of plastic flow, exceeding that at which the film is able to conform to the stress imposed, or at a speed that is faster than the relaxation rate of the film (the rate of detanglement of the polymer chains). The occurrence of a significant amount of microvoids will impart an opalescent or silvery appearance to the surface of the film due to light scattering from the defects. In contrast, film surfaces lacking significant microvoids have a transparent appearance. The presence of microvoids may be verified by small-angle x-ray or density measurement, or by microscopy. The appearance can serve as an empirical test of the suitability of an oriented film for the production of a microfibrillated surface. It has been found that an oriented film lacking in significant amount of microvoids is not readily microfibrillated, even though the film may be split longitudinally, as is characteristic of highly oriented polymer films having a fibrous morphology.

The orientation (stretching) step is preferably done immediately after the calendering step, i.e., the calendered film is fed directly from the calender nip to the length orienting equipment. A minimum gap between the calender nip to the first length-orienting roller minimizes cooling and avoids creasing of the film. The tension of the length-orienting machine is maintained so that essentially no relaxation occurs during the orientation step and orientation imparted during calendering is maintained. Preferably the length orientation apparatus comprises a plurality of orientation rollers, whose relative speeds are controlled so as to impart a gradual draw or orientation to the film. Further the plurality of rollers may be temperature controlled to provide a gradual temperature decrease to the oriented film and thereby maximize the orientation.

The film may then be substantially uniaxially oriented, i.e. oriented to a total draw ratio greater than or equal to 20:1, while restricting transverse orientation to less than 2:1. The film may be sequentially, uniaxially orient the film in more than one orientation step to maximize the orientation and concomitantly the crystallinity of the film. Thus the film may be first uniaxially oriented 4:1 to 10:1, then subsequently oriented 4:1 to 10:1, for a total draw ratio of 20:1 to 40:1.

The temperature of the first orientation (or stretching) affects film properties. Orientation temperature control may be achieved by controlling the temperature of heated rolls or by controlling the addition of radiant energy, e.g., by infrared lamps, as is known in the art. A combination of temperature control methods may be utilized.

Too low of an orientation temperature may result in a voided or unevenly oriented film. Increasing the first orientation temperature may reduce the uneven stretching, giving the stretched film a more uniform appearance. If the film is to be subsequently microfibrillated, the first orientation temperature also affects the amount of microvoiding that occurs during orientation. In the temperature range in which microvoiding occurs, the lower the orientation temperature, generally the greater the amount of microvoiding that occurs during orientation. A second orientation in the same direction may be desired. The temperature of such second orientation is generally similar to or higher than the temperature of the first orientation.

After the film has been stretched it may be further processed. For example, the film may be annealed or heat-set by subjecting the film to a temperature sufficient to further crystallize the polymer while restraining the film against retraction in both directions of stretching.

The final thickness of the film will be determined in part by the casting thickness, the calendered thickness and the degree of orientation. For most uses, the final thickness of the film prior to slitting will be 5 to 50 mils (0.13 to 1.3 mm), preferably 10 to 20 mils (0.25 to 0.50 mm).

After the film has been oriented to the desired degree, the film may be slit into individual, discrete ribbons by any means known to the art. The oriented film is slit into widths so that the resulting ribbons are substantially rectangular, having a transverse aspect ratio of 1.1:1 or greater. The ribbons may be of a single transverse aspect ratio or a distribution of ribbons having two or more aspect ratios. Since the ribbons are prepared optimally from an oriented film of a preselected thickness, the resulting ribbons may be a single width or a distribution of ribbons having two or more widths. Useful means of slitting the film into ribbons includes a shear slitter, a fluid-jet and a rotating drum having a plurality of pins or cutting heads disposed thereon.

The resulting oriented ribbons may then be chopped to fibers of preselected lengths using any technique know to the art. Generally, the fibers may be in lengths from about 0.25 to 4 inches (~0.64 to 10 cm). The fibers may be a single length, or a distribution of several lengths. Alternatively the oriented film may be slit into pre-selected lengths and subsequently split into fibers of preselected widths.

If desired, a shape or pattern may be imparted to the fibers to reduce pull-out from the matrix. Patterns and shapes do not necessarily refer to a regular repeating array, but may mean a random array of features having the same or different sizes, as long as it promotes surface area and/or improves adhesion (reduces the tendency to pull out) with the cementitious matrix. When suitably shaped or patterned, the fibers better resist pull-out. The selection of shapes or patterns of the fibers is generally a function of the size specific matrix elements, with larger shapes useful for conventional concrete and smaller shapes or patterns more useful for matrices having microscopic elements such as microcrystalline silica or fly ash.

The shapes are generally macroscopic, i.e. each pattern element generally larger than the average diameter of the fiber, while the patterns are generally microscopic in which each element is smaller than the average diameter of the fiber. Further, the shapes and patterns may be continuous or discontinuous, regular or random. Macroscopic shapes may include sine-wave configurations, saw-tooth configurations, helices, twists, crimps, bends, coils, and are generally imparted by techniques such as crimping and cold embossing. Useful macroscopic shapes, and methods of imparting them are described in U.S. Pat. No. 5,981,630 (Banthia et al.) and U.S. Pat. No. 5,985,449 (Dill), both incorporated herein by reference.

The fibers may further comprise a microscopic pattern embossed on at least one major surface. Embossing can be carried out by any means known in the art. The preferred method of embossing is to move the oriented film, prior to slitting, through a nip having an embossing surface. "Nip" refers to two rolls in proximity that apply pressure on a film when the film passes between them. The nip may comprise an embossing roll and a smooth roll, or may comprise a male and female pair of rolls. The embossing surface(s) contacts the film with sufficient force to create embossments in the surface of the film. Preferably the embossing is conducted at a temperature sufficiently low so that the degree of crystallinity or the degree of orientation is not substantially compromised. Most preferably the temperature is below about 30° C.

Patterns suitable for the practice of this invention include four-sided square pyramids, truncated four-sided square pyramids, cones, straight lines, ribs, wavy lines, square or rectangular blocks, hemispheres and the like and are imparted to at least a portion of the embossing roll. An individual feature of the pattern is referred to as an embossment. The number and spacing of embossments, as well as the nature of the individual embossment, such as its depth, degree of sharp edges, and shape can be varied as desired to promote bonding with the matrix and reduce the tendency of the fibers to pull out. The pattern is preferably imparted to the oriented film prior to slitting and chopping, or to the slit film (ribbon) prior to chopping, but can be imparted to the slit and chopped fibers.

If desired, the fibers may be coated or otherwise treated with a wetting agent to improve the dispersability. The application of a wetting agent may be used to provide the fibers with a surface tension in the range of 65–80 dynes/$cm^2$, rendering the fibers more hydrophilic and therefore more readily dispersible in the aqueous cement slurry. Useful wetting agents include fatty acid ester of glycerides, fatty acid amides, polyglycol esters, polethoxylated amides, cationic and nonionic surfactants, such as phosphate esters. Such wetting agents may also be used to form a soluble binder that may be used to bundle the fibers, and which then dissolves during dispersal.

If desired, the large fibers may further comprise a microfibrillated surface on at least one major surface of the fibers. Microfibrillated surfaces are believed to be particularly beneficial for cementitious matrices containing microscopic elements or particles such as fly ash or microcrystalline silica. As previously described, if a microfibrillated surface is desired the film is generally length oriented (stretched) sufficiently to impart a microvoided surface to the film to enable subsequent microfibrillation. The highly-oriented, highly crystalline film is then microfibrillated by imparting sufficient fluid energy to the surface to release the microfibers from the polymer matrix, which remain attached to the film surface.

One method of microfibrillating the surface of the film is by means of fluid jets. In this process one or more jets of a fine fluid stream impact the surface of the polymer film, which may be supported by a screen or moving belt, thereby releasing the microfibers from the polymer matrix. One or both surfaces of the film may be microfibrillated. The degree of microfibrillation is dependent on the exposure time of the film to the fluid jet, the pressure of the fluid jet, the cross-sectional area of the fluid jet, the fluid contact angle, the polymer properties and, to a lesser extent, the fluid temperature. Different types and sizes of screens can be used to support the film.

Any type of liquid or gaseous fluid may be used. Liquid fluids may include water or organic solvents such as ethanol or methanol. Suitable gases such as nitrogen, air or carbon dioxide may be used, as well as mixtures of liquids and gases. Any such fluid is preferably non-swelling (i.e., is not absorbed by the polymer matrix), which would reduce the orientation and degree of crystallinity of the microfibers. Preferably the fluid is water. The fluid temperature may be elevated, although suitable results may be obtained using ambient temperature fluids. The pressure of the fluid should be sufficient to impart some degree of microfibrillation to at least a portion of the film, and suitable conditions can vary widely depending on the fluid, the nature of the polymer, including the composition and morphology, configuration of the fluid jet, angle of impact and temperature. Typically, the fluid is water at room temperature and at pressures of at least 3400 kPa (500 psi), although lower pressure and longer exposure times may be used. Such fluid will generally impart a minimum of 5 watts or 10 $W/cm^2$ based on calculations assuming incompressibility of the fluid, a smooth surface and no losses due to friction. Further details regarding the microfibrillation of films may be made to U.S. Pat. No. 6,110,588 (Perez et al.), the entirety of which is incorporated herein by reference.

The fibers thus prepared may be incorporated in and distributed through the cementitious matrix in any convenient manner, and in any amount sufficient to improve the flexural strength of the cured cementitious article. Generally the fibers are added in amounts of 0.05 to 7 volume percent, and preferably 1 to 3 volume percent, based on the total volume of cement, water, aggregate and other materials or additives. Amounts less than 0.05 volume percent are generally not useful since the toughness or strength is not significantly enhanced. Amounts greater than about 7 volume percent may be difficult to distribute uniformly with the desired random orientation, which results in difficulty in working the composite and generally lower fracture toughness and average residual strength of the cured composite.

The microfibrillation may also impart an embossed pattern to the surface of the film where the supporting screen or belt has a pattern thereon. The film may be placed on top of this patterned support and moved under jet heads while the high-pressure fluid is imparted to the surface. The high-pressure fluid will microfibrillate the surface of the film and imparts the underlying pattern thereto. A pattern may also be imparted to the film, without concurrent microfibrillation by the use of masks.

If desired, the composite may further comprise smaller diameter fibers. Such fibers are effective in restraining the propagation of microcracks that occur as the cementitious composition cures. If desired, such smaller fibers may have nominal diameters of 70 micrometers or less, and lengths from 0.25 to 2 cm. and may be of any cross-sectional shape. Preferably such fibers, when used, are oriented. When used, such fibers may be added to the cementitious matrix concurrently with the larger fibers herein described. Because fine fibers have a high aspect ratio, it is difficult to load a significant volume of fine fibers into concrete to adequately toughen it. Beneficially, the present larger fibers aid in the dispersion of these smaller fibers, and reduce the tendency to agglomerate.

In one embodiment the fibers are added to the dry cement and distributed by mechanical agitation, or may be added to the cement slurry and then agitated. It has been found that a degree of microfibrillation is imparted to the fibers as result of the mixing in the slurry. Such microfibrillation imparts a microfibrous surface, i.e. a surface of fine rectangular microfibers having average diameter of less than about 10 micrometers. The fibers generally require only a short time, e.g. one to five minutes, to be adequately distributed through the cementitious matrix due in part to the stiffness of the fibers. In another embodiment, the fibers may be fed into an atomized jet of cement slurry and combined in a nozzle, such as those nozzles and apparatus used for spray concrete. Surprisingly, the large fibers demonstrate little tendency to split further into smaller fibers or fibrillate when mixed. Such splitting into finer fibers would reduce the tensile strength of each fiber.

Normally the fibers will be distributed throughout the cementitious matrix from which cementitious articles are prepared, and are preferably distributed homogenously through the matrix. However, in some application it may be desirable to effect a non-homogenous distribution by localizing the fibers to the load-bearing or impact-prone areas of the article. This may be done by using a conventional cement matrix without fibers in addition to cement matrix containing fibers. Alternatively, the fibers may be pre-placed, such as with an overlay or repair, and infiltrated with the cementitious slurry.

If desired the reinforcing fibers may be bundled to provide a package of fibers maintained in a close-packed, substantially co-linear arrangement of fibers. Typically a wrap may be used, which is maintained under sufficient tension to minimize movement of the bundles fibers relative to one another, and which will dissolve or burst in contact with the agitated cementitious slurry. Such bundles are advantageous for handling the fibers and aid in the distribution of the fibers uniformly through the cementitious matrix. Useful bundles and techniques for bundling are described in U.S. Pat. No. 5,807,458 and U.S. Pat. No. 5,897,929 (Sanders et al.), and U.S. Pat. No. 5,993,537 (Trottier et al.), each incorporated herein by reference.

Test Procedures

Test Procedure I—Tensile Modulus and Tensile Strength Measurement of Films and Fibers Tensile modulus and tensile strength were measured using an Instron tensile testing machine, Model 1122 (Instron Corp., Park Ridge, Ill.) equipped with a 5 kN load cell, Model 2511-317 (Instron Corp., Park Ridge, Ill.). A crosshead speed of 0.254 cm/min was used for all testing. Freestanding samples measuring 12.7 mm wide, and a distance between grips of 2.54 cm were used. Tests were conducted at 23° C. unless otherwise specified.

Test Procedure II—Density Measurement and Void Content Determination

Density of the films and fibers was measure at 23° C. in deionized water according to the method of ASTM D792-86. Samples were weighed on a Mettler AG245 high precision balance (Mettler-Toledo, Inc., Highstown, N.J.), and placed underwater. The mass of the water displaced was measured using the density measurement fixture. The volume of water displaced by the sample was thereby determined and, in combination with the sample weight, used to calculate the sample density. The void content was then calculated as follows:

Calculated Void content=$\{1-(\text{final density/initial density})\} \times 100$ where the initial density is the density of the cast film before orientation, and the final density is the density of the oriented film.

Test Procedure III—Draw Ratio Measurement

Density, width, and thickness of the cast film and of the oriented and voided film were measured. The draw ratios of the oriented and voided films were calculated by dividing (density×width×thickness) of the cast film by (density× width×thickness) of the oriented and voided film according to the following equation:

Draw Ratio=(density×width×thickness)$_{cast\ film}$/(density×width× thickness)$_{oriented}$ film Test Procedure IV—Measurement of the Average Residual Strength of Concrete Specimens It has been shown that for fiber reinforced concrete (FRC) made using low to moderate fiber dosages the peak load obtained in a flexure test is not significantly different than that found for an otherwise identical but unreinforced (plain) concrete. Post cracking performance of FRC is, however, quite different from that of plain concrete. This is shown using a test methodology for FRC that is capable of isolating the post cracking load-deflection behavior.

A Tinius-Olsen Universal testing machine (available from Tinius Olsen Testing Machine Co., Inc., Willow Grove, Pa.) with 300 kN load capacity was used for the Average Residual Strength (ARS) testing. In addition to the low voltage displacement transducers (LVDT), a specially designed frame was used to mount a dial gauge with 0.0025 mm (0.0001 in.) resolution for back-up purposes. This frame was supported only at four points, which were on the neutral axis above the supports. The dial gauge was fixed such that it was touching the center point of the bottom surface of the concrete specimen to be tested. This arrangement enabled measurement of the true deflection excluding any extraneous deformations due to crushing of concrete at supports and load points, and any deformations and strains induced in the testing frame. Because the deflection was measured at the center point, any slight warping or twisting of the concrete beam specimen did not affect true deflections measured.

ASTM C1399, a flexure test that uses a pre-cracked beam, was used to determine Average Residual Strength of concrete beam specimens. To help control the pre-cracking process and reduce the influence of variability of testing machines, ASTM C1399 required loading the test beam to the point of cracking in a parallel loading arrangement with a ductile material. Steel was used for this purpose in a manner such that much of the energy that was released at the time of cracking was either absorbed or dissipated so as not to influence beam specimen cracking. The concrete beam specimen was turned on its side with respect to its position as molded and placed on top of the steel plate to be loaded with the specimen. The plate and the beam specimen were placed on the support apparatus; so that the steel plate was centered on the lower bearing blocks, and the concrete beam specimen was centered on the steel plate. In this four point bend test, the two pivot points upon which the beam rested, called "bearing blocks", were spaced 304.8 mm apart, center-to-center. The steel plate was only present to pre-crack the concrete. After the concrete was pre-cracked, the steal plate was removed and the concrete beam was cracked all the way.

Both, the LVDT's and dial gauges reading accurate to +/−0.0025 mm were used in the investigation to cross check the center span deflection readings. The rate of platen or cross-head movement was set at 0.65+/−0.15 mm/min (0.025+/−0.005 in/min), using a mechanical dial gauge, before the specimen was loaded.

The purpose of the stainless steel plate was to support the test beam during the initial loading cycle to help control the expected high rate of deflection of the specimen upon cracking. A center hole was placed in the steel plate to accommodate placing a displacement transducer probe directly against the bottom of the concrete beam specimen.

A data acquisition system was activated and responded to signals from all load and displacement transducers. Then the specimen and steel plate combination were loaded at the set rate and the loading was continued until the specimen cracked or it reached a deflection of 0.50 mm (0.02 in), whichever occurred first. If cracking had not occurred at this stage, the test was considered invalid. The maximum load to calculate modulus of rupture was not used in accordance with Test Method ASTM C 78 as this load would have included load carried by the steel plate as well as by the concrete specimen.

For reloading the cracked beam specimen only, the steel plate was removed and the cracked beam was centered on the lower bearing blocks retaining the same orientation as during the initial loading test cycle. The displacement transducers were adjusted to lightly contact the beam specimen to obtain net deflection; so that readings were immediately obtained upon beam reloading. The deflection-recording device was again brought to zero, and the cracked beam specimen was reloaded at the specified rate. The test was terminated at a deflection of 2.5 mm (0.10 in) as measured from the beginning of reloading.

Using the Microsoft® Excel™ software package, graphs were drawn, and residual strengths were calculated for loads at reloading deflections of 0.50, 0.75, 1.00, and 1.25 mm (0.02, 0.03, 0.04, and 0.05 in), using the following formula:

$$ARS=((PA+PB+PC+PD)/4)\times K$$

where $K=l/bd^2$, mm-2 (in-2) and ARS=Average Residual Strength, MPa (psi) PA+PB+PC+PD=recorded loads at specified deflections, N (lbf) l=span length, mm (in), b=average width of specimen, mm (in) and d=average depth of specimen, mm (in).

Test Procedure V—Measurement of Japanese Toughness of Concrete Specimens

Japanese toughness of concrete specimens was determined as another means to effectively differentiate between FRC mixtures made with different fiber types.

Toughness was determined by calculating the area under the plot of load versus deflection (out to a deflection of 2 mm) obtained in Test Procedure IV.

Casting of the Concrete Specimens

Type I/II Normal Portland cement (available from Dakota Cement, Rapid City, S. Dak.), satisfying ASTM C 150, was used. The coarse aggregate used was crushed limestone. The maximum size of the aggregate used was 19 mm in diameter with a water absorption coefficient of 0.45%. The fine aggregate used was natural sand with a water absorption coefficient of 1.6%. Both the coarse and fine aggregates were screened according to the grading requirements of ASTM C33. The water used was tap water from the Rapid City Municipal water supply system (Rapid City, S. Dak.).

All mixing was done in a 0.17 m³ capacity mixer. The fibers were weighed accurately and kept in a separate plastic container. A buffer mix was prepared by first placing the coarse aggregate in the mixer and then adding the sand, and two thirds of the total amount of the water to the aggregate in the mixer, followed by mixing for one minute. The cement was then added along with the remaining one third of the water. The total mix volume was 0.057 m³. The ingredients were mixed for three minutes, then allowed to stand without mixing for two minutes, and then further mixed for two minutes. Fibers were added to the concrete by hand, and mixing was done for two minutes to obtain uniform distribution of the fibers. All fibers were added to the concrete at concentrations of 1.0 percent by volume of concrete.

The concrete was cast into concrete cylinders for compression testing to assure that the concrete was the same in all specimens and rectangular concrete beams for measuring average residual strength. Each cylinder was 102 mm in diameter and 203 mm in length. Each of the concrete beams was 102 mm thick, 102 mm wide, and 356 mm long, and was used to measure flexural strength. A total of 3 beams and 3 cylinders were cast for each batch.

The beam and cylinder specimens were cast according to the known ASTM standards and covered with plastic sheets for 24 hrs at room temperature. The specimens were then placed in a lime saturated water tank maintained at 23+/−1.70° C. (73+/−3.00° F.) for 28 days and then tested.

The concrete cylinder specimens were tested for compressive strength using ASTM C39 at 28 days after casting. The results showed that all concrete used in all of the specimens was the same.

EXAMPLE 1

Polypropylene film was prepared by extruding polypropylene homopolymer (Fina 3374X, available from Fina Inc., Dallas, Tex.) in a single screw extruder with an extruder temperature profile of 190° C., 210° C., 220° C., 230° C. from the feed throat to the end of the extruder. The neck tube and die were maintained at 230° C. The extruder was equipped with a barrier screw having a Maddoch mixing tip and with a 12.7 cm wide, single layer Cloeren die having an orifice gapped to a nominal 0.245 cm. A film having a thickness of 1.9 mm and a width of 127 mm was prepared using a three-roll stack casting station. In the three-roll stack, the bottom chrome-coated stainless steel roll was set to 71° C., the middle chrome-coated stainless steel roll was set to 80° C., and the top silicon rubber roll was cooled with 45° C. water. The polymer melt exiting the extruder die entered the three-roll stack between the bottom and middle rolls, and after passing between the bottom and middle rolls, traveled over the middle roll into the nip formed by the middle and top rolls. After passing over the top roll, the resulting cast film exited the three-roll stack. During film preparation, the silicon rubber roll heated up to near the temperature of the middle roll.

The cast film was fed from an unwind station into the compressive nip of a first calender (two rolls) at a surface speed of 1.22 m/min, a temperature of 149° C., and a pressure of 2.76 MPa. The film exiting the first calender was fed into a second and third pulling calender set (two rolls in each set) operating at as high a surface speed as possible without breaking the film. The resulting oriented and voided film was wound onto a core under tension. The films were oriented to a draw ratio of 15.3:1 as determined by Test Procedure III, had a thickness of 180 micrometers, and contained 6.6% voids as determined by Test Procedure II. The tensile strength and modulus of the film were measured according to Test Procedure I and found to be 390 MPa and 10.8 GPa, respectively.

The resulting oriented film was slit into fibers using a Razor/Score Slitter, Model# 325B17 (manufactured by Arrow Converting Equipment Inc., Fairfield) and chopped into 51 mm lengths using a 12-inch (30.5 cm) Mark 1 guillotine. The resulting individual fibers were 180 micrometers (~7.1 mil) thick, 1.3 mm wide, and 51 mm long.

EXAMPLE 2

Polypropylene film was prepared by extruding polypropylene homopolymer (Fina 3374X, available from Fina Inc., Dallas, Tex.) with 0.01% of a gamma-quinacridone (Hostaperm Red E3B pigment, available from Clariant GmbH, Frankfurt, Germany) beta-nucleating agent in a single screw extruder with an extruder temperature profile of 190° C., 210° C., 220° C., 230° C. from the feed throat to end of the extruder. The neck tube and die were maintained at 230° C. A film having a thickness of 2.3 mm and a width of 114 mm was prepared using a three-roll stack casting station as in Example 1, except that the silicone rubber roll was cooled with 35° C. water.

The resulting cast film was oriented as in Example 1. The resulting oriented film had a draw ratio of 13:1 as determined by Test Procedure III, had a thickness of 211 micrometers, and contained no voids as determined by Test Procedure II. The tensile strength and modulus of the film were measured according to Test Procedure I and found to be 310 MPa and 7.5 GPa, respectively.

The oriented films were slit into fibers using a shear slitter, such that the resulting individual fibers were 1.59 mm wide. The fibers were then cut to 51 mm lengths as previously described. The resulting individual fibers were 211 micrometers (~8.3 mil) thick, 1.59 mm wide, and 51 mm long.

EXAMPLE 3

Calendered/length oriented film prepared as in Example 1 was cold embossed between two textured rolls that were maintained at room temperature.

The resulting embossed films were slit into fibers using a shear slitter, such that the resulting individual fibers were 1.59 mm wide. The fibers were then cut to 51 mm lengths as previously described. The resulting fibers had a wavy or crimped structure.

EXAMPLE 4

Calendered/length oriented film prepared as in Example 1 was microfibrillated on both major surfaces in a hydroentangler (70 cm wide, S/N 101, Project# 2303: manufactured by Honeycomb Systems Inc., Biddeford, Me.) using 2 passes on each side, a belt speed of 3.05 n/min, a water jet strip having 15.75 holes/cm, each hole having a diameter of 1.0 micron with 0.5 mm spacing between holes.

Figure 1:
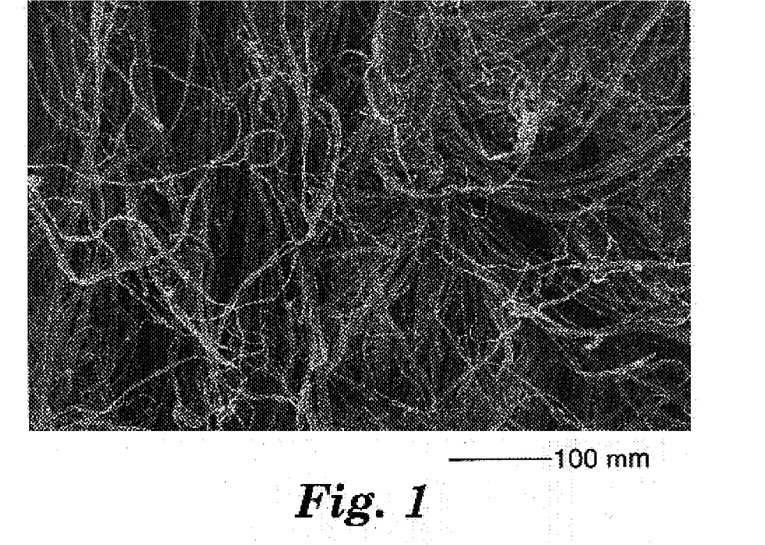
FIG. 1 is a digital image of a scanning electron micrograph of concrete fiber sample 4, before it was mixed with the cementitious matrix.
Figure 2:
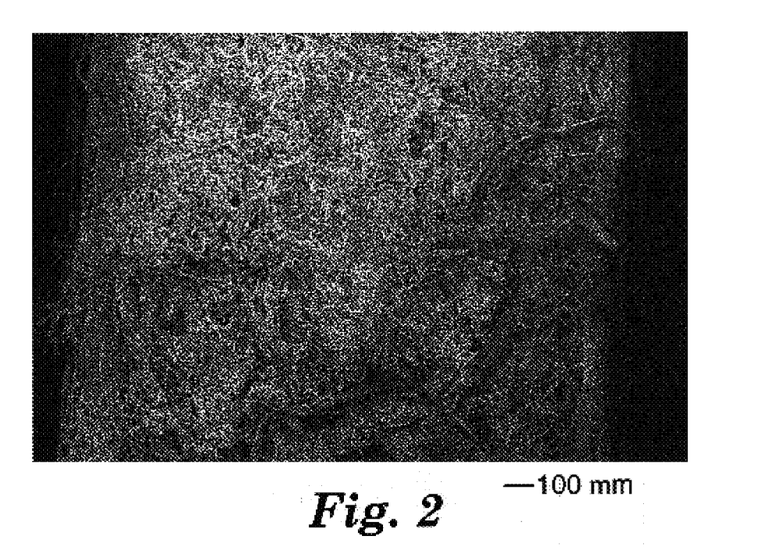
FIG. 2 is a digital image of a scanning electron micrograph of concrete fiber sample 4, after it was mixed with the cementitious matrix, removed from the matrix, and washed with water.

The resulting surface-microfibrillated film was slit into fibers using a Razor Slitter and chopped into 51 mm lengths as previously described. The individual fibers were 1.3 mm wide, and 51 mm long. The fibers may be seen in FIGS. 1 and 2. From this, one can see how the microfibers can provide increase surface adhesion with the concrete. This figure also shows that some of the microfiber can disconnect from the larger fiber and hence inhibit the initiation of micro-cracks while the concrete sets up.

EXAMPLES 5 AND 6

Polypropylene film was prepared by extruding polypropylene homopolymer (Fina 3376X, available from Fina Inc., Dallas, Tex.) in a single screw extruder with an extruder temperature profile of 232° C., 238° C., 243, 249° C., 254° C., 260° C. from the feed throat to end of the extruder. The neck tube and die were maintained at 260° C. The extruder was equipped with a barrier screw having a Maddox mixing tip and with a 61 cm wide die with an orifice gapped to a nominal 1.8 mm. A film having a thickness of 1.8 mm and a width of 610 mm was prepared using a three-roll stack casting station as in Example 1. Each of the rolls was made of chrome-coated stainless steel and set to approximately 93° C.

The cast film was calendered and length oriented on an S-wrap type calender. In this process the cast film was first preheated on and traveled around rolls 1 and 2 held at 145° C. and having surface speeds of 1.22 and 1.24 n/min, respectively. The film then traveled around rolls 3 and 4 of an s-wrap type calender. The gap between rolls 3 and 4 was set to 0.2 mm with roll 3 controlled at a temperature of 130° C. and a surface speed of 1.28 m/min and roll 4 controlled at a temperature of 120° C. and a surface speed of 8.66 m/min. The resulting film then traveled around roll 5 operating at a temperature of 140° C. and a surface speed of 18.44 m/min. In this S-Wrap type process rolls 3 and 4 both calendered and sheared the film, and roll 5 additionally stretched the film. The resulting oriented and voided film was wound onto a core under tension and had a draw ratio of close to 14:1 as determined by Test Procedure III, and a width of 333 millimeters.

Due to the necking down of the oriented and voided film, the edges of the film were thicker and more voided than the center of the film. For this reason, the film was slit into four separate films. Films cut from the center 166 millimeters of the oriented and voided film were 0.229 millimeters thick on average, and had 9.5% voids by volume as determined by Test Procedure II. The tensile strength and modulus of the films measured according to Test Procedure I and found to be 352+/−34 MPa and 8.8+/−0.3 GPa, respectively. The films were slit into 1.6-millimeter wide fibers using a razor slitter. The resulting fibers (Example 5) were then wrapped, bundled together with a wrapper, and chopped into 51 mm lengths. The resulting individual fibers were 0.229 millimeters thick, 1.6 mm wide, and 51 mm long. The wrapper was removed from the fibers prior to mixing the fibers into concrete.

Films cut from the outer 83 millimeters edges of the oriented and voided film were 0.386 millimeters thick, on average, and had 11.4% voids by volume as determined by Test Procedure II. The tensile strength and modulus of the films measured according to Test Procedure I were found to be 360+/−21 MPa and 8.6+/−0.7 GPa, respectively. These films were slit into 3.2 mm wide fibers using a Razor Slitter. The resulting fibers (Example 6) were then wrapped, bundled together and chopped into 50.8 mm lengths. The resulting individual fibers were 0.386 millimeters thick, 3.2 mm wide, and 50.8 mm long. The wrapper was removed from the fibers prior to mixing the fibers into concrete.

Comparative Example C1

Concrete specimens were cast as described above, but with no fibers added. Japanese Toughness was determined according to Test Procedure V. The result is shown in Table 3.

Comparative Example C2

Fiber reinforced concrete specimens were cast as described above, using Scotch® Cast 50/63 structural concrete toughening fibers (extruded polypropylene fibers having a diameter of 0.63 mm, a length of 50 mm, a reported tensile strength of 276 MPa, and a reported modulus of 2.6 GPa, available from 3M, St. Paul, Minn.). Average residual strength of the resulting specimen was measured according to Test Procedure IV, and the result is shown in Table 1. Japanese Toughness was determined according to Test Procedure V, and the result is shown in Table 3.

EXAMPLES 7–10

Fiber reinforced concrete specimens were cast as described above using the fibers prepared in Examples 1–4. Average residual strengths of the resulting specimens were measured according to Test Procedure IV, and the results are shown in Table 1.

TABLE 1

Average Residual Strengths Of Concrete Specimens

| Example | Fibers | Fiber (Precursor Film) Modulus (GPa) | Fiber Cross Section (mm$^2$) | Average Residual Strength (MPa) |
|---|---|---|---|---|
| 7 | Example 1 | 10.8 | 0.234 | 3.24 |
| 8 | Example 2 | 7.5 | 0.335 | 3.10 |
| 9 | Example 3 | 10.8 | (0.335)* | 3.49 |
| 10 | Example 4 | 10.8 | (0.335)* | 2.01 |
| C2 | Scotch ® Cast 50/63 | 2.6 | 0.312 | 1.43 |

*Embossing and surface microfibrillation may have changed the cross section.

The results in Table 1 show that the highly oriented PP fibers of Examples 1–4 provided better toughening to concrete when compared to the monofilament fibers of Comparative Example C2. In addition, the higher average residual strength of Example 7 compared with that of Example 8 was consistent with the higher modulus of the Example 1 fibers compared with the Example 2 fibers. The results also show that adding a crimp or wave to the fiber (Example 9) improved the performance over that without embossing (Example 7). Finally, comparing Examples 7 and 10 shows that microfibrillating the surface of the fibers did not improve the average residual strength. However, it is believed that due to the presence of microfibers in Example 10, it is believed there was a benefit of fewer micro-cracks formed.

EXAMPLES 11–12

Fiber reinforced concrete specimens were cast as described above using the fibers prepared in Examples 5 and 6. Average residual strengths of the resulting specimens, as well as specimens prepared by repeating Example 7 and Comparative Example C2, were measured according to Test Procedure IV, and the results are shown in Table 2.

TABLE 2

Average Residual Strengths Of Concrete Specimens

| Example | Fibers | Fiber (Precursor Film) Modulus (GPa) | Fiber Cross Section (mm$^2$) | Average Residual Strength (MPa) |
|---|---|---|---|---|
| 7 | Example 1 | 10.8 | 0.234 | 3.54 |
| 11 | Example 5 | 8.8 | 0.366 | 2.49 |
| 12 | Example 6 | 8.6 | 1.235 | 1.97 |
| C2 | Scotch ® Cast 50/63 | 2.6 | 0.312 | 1.59 |

The results in Table 2 show that the highly oriented PP fibers of Examples 1, 5 and 6 provided better toughening to concrete when compared to the monofilament fibers used in Comparative Example C2. Also, by comparing the average residual strength of Example 7 to the average residual strengths of Examples 11 and 12, it is apparent that the higher tensile properties of Example 1 fibers provided significantly more residual strength to the fractured specimen than the fibers of Examples 5 or 6. Further, comparing Examples 11 and 12, which utilized fibers having approximately the same tensile properties, the improved performance of Example 11 over Example 12 was due to the lower cross section of the Example 5 fibers. This is because lower cross section fibers have more surface area per volume of fibers, compared to larger cross section fibers. From this comparison and the results shown in Table 1, the importance of having high surface area and/or a textured (such as crimped or wavy) fiber to help grip the concrete better and prevent fiber pullout can be seen.

Finally, by comparing the average residual strength Example 8 to that of Examples 11 and 12, the effect of the calendering mode may be seen. The fibers of Example 2 used in Example 8 had lower tensile properties than those of Example 5 used in Examples 11. However, Example 8 in Table 1 had a higher average residual strength than Example 11. This suggests that the method of calendering the films straight through the calender nip is surprisingly beneficial over the S-wrap type calendering method.

EXAMPLE 13

Polypropylene film was prepared by extruding polypropylene (Escorene 4502-E1, polypropylene containing about 0.5 weight % polyethylene, available from Exxon Chemical, Houston, Tex.) in a single screw extruder run at 60 rpm with an extruder temperature profile of 235 to 270° C., from the feed throat to the end of the extruder. The filter section was maintained at 250 to 270° C., and a neck tube and die attached to the end of the extruder were maintained at 250° C. Extruded material was chilled on a water-cooled roll at 36° C., resulting in a film having a thickness of about 2.45 mm. The extruded film was length-oriented at 135° C. at a 5:1 draw ratio in the machine direction and collected on a roll. The resulting film was fed at 1.5 m/min into a 4-roll calendering apparatus; with each roll steam-heated to approximately 150° C. A nip force between the third and fourth rolls effected a biaxial 2:1 draw ratio on the film, which was then fed into a length-orienter with only a 2.54 cm space between the nip roll and the first length-orienting roll. The length-orienter used a series of rolls in such a way that an additional 10:1 draw ratio was achieved while lowering the roll temperature to 23° C. The oriented film was passed through a nip-roller to maintain tension, then taken up on a roll. A total draw ratio of 20:1 was achieved, resulting in an oriented film having a thickness of approximately 0.25 mm. The tensile strength and modulus of the oriented film were measured according to Test Procedure I and found to be 496 MPa and 8.9 GPa, respectively.

The oriented films were slit into fibers using a shear slitter, such that the resulting individual fibers were 1.6 mm wide. The resulting fibers were then bundled together, wrapped and chopped into 51 mm lengths. The resulting individual fibers were 0.25 millimeters thick, 1.6 mm wide, and 51 mm long. The wrapper was removed from the fibers prior to mixing the fibers into concrete.

EXAMPLE 14

Fiber reinforced concrete specimens were cast as described above using the fibers prepared in Example 13. Japanese Toughness of the resulting specimens were measured according to Test Procedure V, and the results are shown in Table 3.

Comparative Example C3

Fiber reinforced concrete specimens were cast essentially as described above using 0.5 weight % of steel fibers. This was the highest loading that could be achieved with these fibers. Japanese Toughness of the resulting specimens was measured according to Test Procedure V and the results are shown in Table 3.

TABLE 3

Japanese Toughness of Fiber Reinforced Concrete Specimens.

| Example | Fibers | Japanese Toughness (megaNewton-meter) |
|---|---|---|
| 14 | Example 13 | 4.5 |
| C1 | None | 0 |
| C2 | Scotch ® Cast 50/63 | 2.3 |
| C3 | Steel | 2.7 |

The results in Table 3 show that the highly oriented polypropylene fibers of Example 13 produced a surprisingly large increase the toughness of concrete containing the fibers in comparison with known fibers and no fibers.

What is claimed is:

1. A cementitious composite comprising discrete, oriented, semicrystalline polymeric fibers greater than 127 micrometers (5 mils) in thickness, a transverse aspect ratio (thickness to width) of 1:1.1 to 1:75 and a tensile modulus of 1000 kpsi (6895 MPa) or greater.

2. The fibers of claim 1 having a thickness of 254 micrometer (10 mils) or greater.

3. The fibers of claim 1 having a thickness of 508 micrometers (20 mils) or greater.

4. The fibers of claim 1 wherein the fibers are between 5 and 50 mils thick, and between 7.5 and 300 mils wide.

5. The fibers of claim 1 wherein said transverse aspect ratio is 1:1.5 to 1:5.

6. The fibers of claim 1 wherein said polymer is a semicrystalline, melt processable polymer and copolymers and blends thereof.

7. The fibers of claim 1, wherein said polymer is selected from the group consisting of high and low density polyethylene, polypropylene, polyoxymethylene, poly (methyl pentene), poly(ethylene oxide), poly(ethylene terephthalate), poly(butylene terephthalate), poly(vinylidene fluoride), nylon 6, nylon 6,6, nylon 6,12, poly(vinyl alcohol), polybutene, or a copolymer or blend thereof.

8. The fibers of claim 4 wherein said polymer is selected from the group consisting of high density polyethylene and polypropylene and the molecular weight of said polymers is from about 5,000 to 500,000.

9. The fibers of claim 5 wherein said polymer blend is selected from the group consisting of polypropylene and polystyrene, and polypropylene and polyethylene.

10. The fibers of claim 1 wherein said film is oriented at least 10:1.

11. The fibers of claim 1 wherein said polymer is oriented at least 20:1.

12. The fibers of claim 1 having a modulus of 1500 kpsi or greater.

13. The fibers of claim 1 having no glass transition temperature above 0° C.

14. The fibers of claim 11 having no glass transition temperature above −25° C.

15. The fiber of claim 1 wherein said fiber are patterned or shaped.

16. The fibers of claim 1 further comprising a topical or additive wetting agent.

17. The fiber of claim 1 having a microfibrillated surface on at least on major surface.

18. The fiber of claim 13 wherein at least one surface of the fiber is an embossed surface.

19. The fibers of claim 1 having a cross-sectional area of from 1000 micrometers$^2$ to 1,500,000 micrometers$^2$.

20. The fibers of claim 1 having lengths of from 0.5 to 10 cm.

21. The composite of claim 1 comprising from 0.1 to 7 wt % added fibers.

22. The composite of claim 1, wherein said fibers are prepared by the steps of:

a) extruding a cast film of melt processable polymer;

b) orienting said cast film;

c) slitting said calendered film into ribbons of preselected widths; and chopping said fibers to preselected lengths.

23. The composite of claim 22 wherein said extruded film is cast onto a cast roll at a temperature of 80° C. or greater.

24. The composite of claim 1 wherein said composite is cast in a preselected shape.

25. The composite of claim 22 wherein said fibers are calendered prior to orienting.

26. The composite of claim 1 wherein said fibers comprise highly oriented, isotactic polypropylene having a weight average molecular weight of from 50,000 to 350,000, no glass transition temperature above −30° C., an elongation at break of 5% or less, a tensile strength of 50,000 psi or greater ($\geqq$345 Mpa) and a melting point of 165–180° C.

27. The composite of claim 1 wherein said fibers have an elongation at break of 10% or less.

28. The composite of claim 25 wherein said fibers are calendered so that both major surfaces are sheared.

* * * * *

UNITED STATES PATENT AND TRADEMARK OFFICE
CERTIFICATE OF CORRECTION

PATENT NO. : 7,192,643 B2
APPLICATION NO. : 09/950161
DATED : March 20, 2007
INVENTOR(S) : Mario A. Perez It is certified that error appears in the above-identified patent and that said Letters Patent is hereby corrected as shown below:

Col. 6
Line 4, delete "(Mw)" and insert -- ($\mathbf{M_w}$) --, therefor.

Col. 17
Line 44, delete "n/min," and insert -- m/min, --, therefor.

Col. 18
Line 8, delete "n/min," and insert -- m/min, --, therefor.

Col. 21
Line 48, in Claim 8, after "polypropylene" insert -- , --.

Signed and Sealed this

Twenty-fifth Day of March, 2008

JON W. DUDAS
*Director of the United States Patent and Trademark Office*